(12) United States Patent
Paty

(10) Patent No.: US 6,273,051 B1
(45) Date of Patent: Aug. 14, 2001

(54) CRANKSHAFT BEARING AND BUSHING ASSEMBLY

(75) Inventor: Max Paty, Neuville aux Bois (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/685,455

(22) Filed: Oct. 9, 2000

(30) Foreign Application Priority Data

Nov. 16, 1999 (DE) ............................................... 199 54 927

(51) Int. Cl.[7] ....................................................... F01M 1/00
(52) U.S. Cl. ...................................................... 123/196 R
(58) Field of Search ............................. 123/196 R, 41.35; 184/6.5, 6.8

(56) References Cited

U.S. PATENT DOCUMENTS

| | | | |
|---|---|---|---|
| 5,072,809 | * 12/1991 | Shibata | ............................... 123/196 R |
| 5,520,466 | 5/1996 | Everitt et al. . | |
| 5,533,472 | 7/1996 | Sands et al. . | |
| 5,896,656 | 4/1999 | Laws . | |
| 5,915,350 | * 6/1999 | Suzuki et al. | ..................... 123/196 R |
| 6,205,971 | * 3/2001 | Inumaru et al. | .................. 123/196 R |

FOREIGN PATENT DOCUMENTS

| | | |
|---|---|---|
| 20 61 341 | 6/1972 | (DE) . |
| 34 03 671 A1 | 7/1985 | (DE) . |
| 0 982 479 A1 | 3/2000 | (EP) . |

OTHER PUBLICATIONS

Deere & Company, "Engine System —Operation/Lubrication System", Saran Liter Engines, Jul. 1999, p. 205–4.

* cited by examiner

*Primary Examiner*—Marguerite McMahon

(57) ABSTRACT

A piston engine includes a crankshaft bearing member and a bearing bushing which receive and rotatably support a crankshaft. The engine also includes a lubricant distribution sleeve which is mounted in the crankshaft bearing member for communicating with an engine lubrication system. The sleeve has an end which engages the bearing bushing and positions the bearing bushing within the crankshaft bearing member. The sleeve also includes a central bore and a radial port which communicate lubricant to the sleeve end and to the bearing bushing.

12 Claims, 2 Drawing Sheets

CRANKSHAFT BEARING AND BUSHING ASSEMBLY

BACKGROUND OF THE INVENTION

The invention relates to a crankshaft bearing and bushing assembly for a piston engine.

U.S Pat. No. 5,896,656 shows a lubricating arrangement for pistons or piston heads of a piston engine or an internal combustion engine. The lubricant is supplied through lubrication channels which supply the bearings or the bearing bushings of the crankshaft with lubricant. Lubricant supply channels which supply lubricant to the piston heads are formed in the cylinder block near the crankshaft bearings. It is known to mount spray nozzles into such lubricant supply channels in order to direct the lubricant to the piston heads for lubrication and cooling. Such nozzles are shown in Component Technical Manual, John Deere Usine de Saran, CTM3274 (Jul. 1, 1999). The aforementioned Component Technical Manual also shows such crankshaft bearings which provide positioning devices in the form of projections or depressions that can interact with corresponding depressions or projections on the cylinder block. Such designs require a costly configuration of the piston engine and the bearing bushings.

SUMMARY OF THE INVENTION

Accordingly, an object of this invention is to provide a low cost configuration for a piston engine and bearing bushings.

These and other objects are achieved by the present invention, wherein a piston engine includes a crankshaft bearing member and a bearing bushing which receive and rotatably support a crankshaft. The engine also includes a lubricant distribution sleeve which is mounted in the crankshaft bearing member for communicating with an engine lubrication system. The sleeve has an end which engages the bearing bushing and positions the bearing bushing within the crankshaft bearing member. The sleeve also includes a central bore and a radial port which communicate lubricant to the sleeve end and to the bearing bushing.

Preferably, the bearing bushing has a port formed therein which receives and engages the end portion of the sleeve. The bearing bushing also preferably includes an inner annular lubrication groove for distributing lubricant over the entire circumference of the bearing. Preferably, the lubrication groove is connected with the sleeve through the port, so that lubricant can flow from the sleeve to the lubrication groove or from the channel into the lubrication groove, depending upon how lubricant is provided. Lubricant is also supplied through the sleeve to the cylinder and piston or piston heads, to the crankshaft bearing, the bearing bushing. The end of the sleeve facing the cylinder forms a spray nozzle which can spray or distribute lubricant or coolant into regions of the cylinder block, so that these can be supplied uniformly with lubricant or coolant.

DETAILED DESCRIPTION

Figure 1:
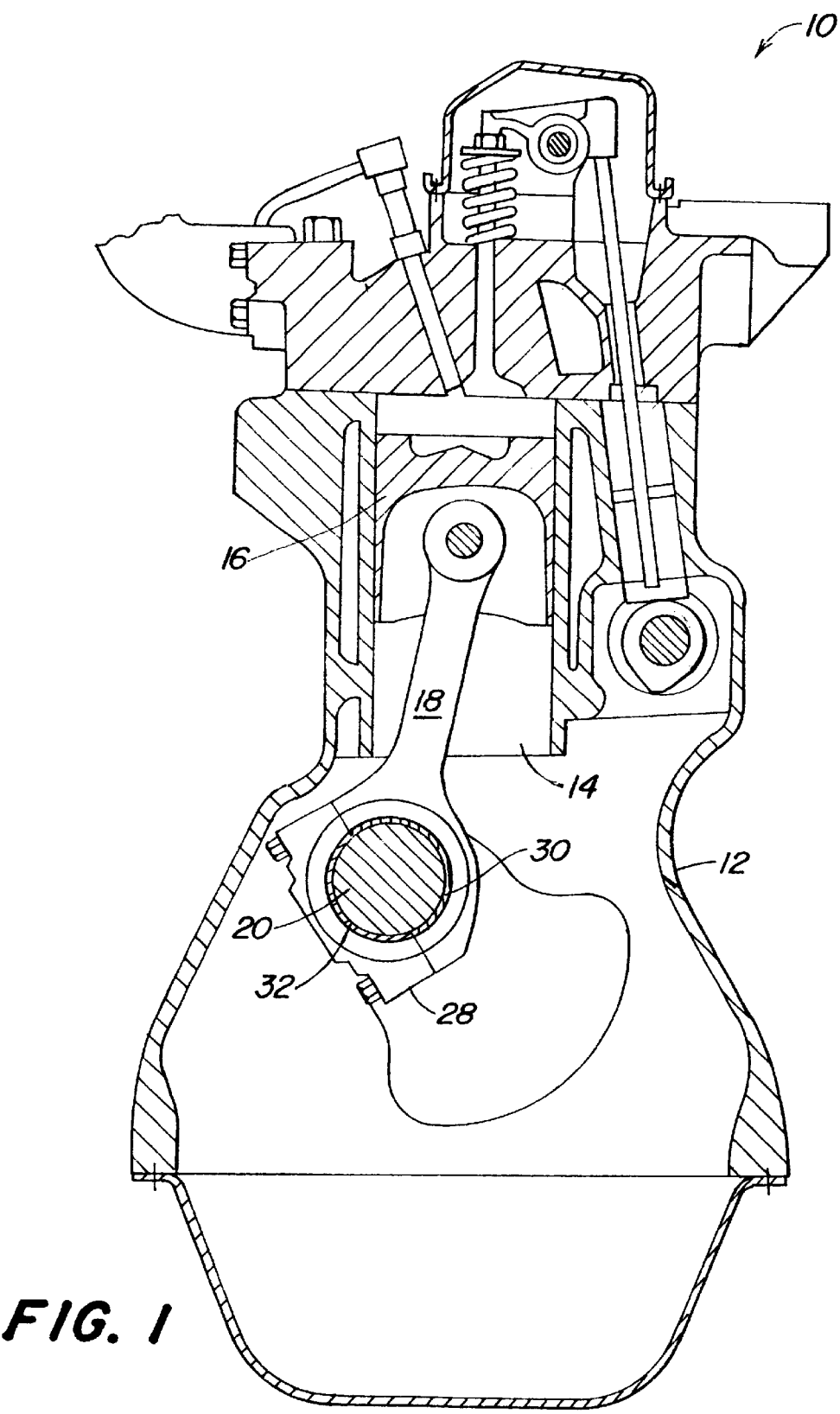
FIG. 1 is a simplified sectional view of a piston engine showing a crankshaft supported in a crankshaft bearing.
Figure 2:
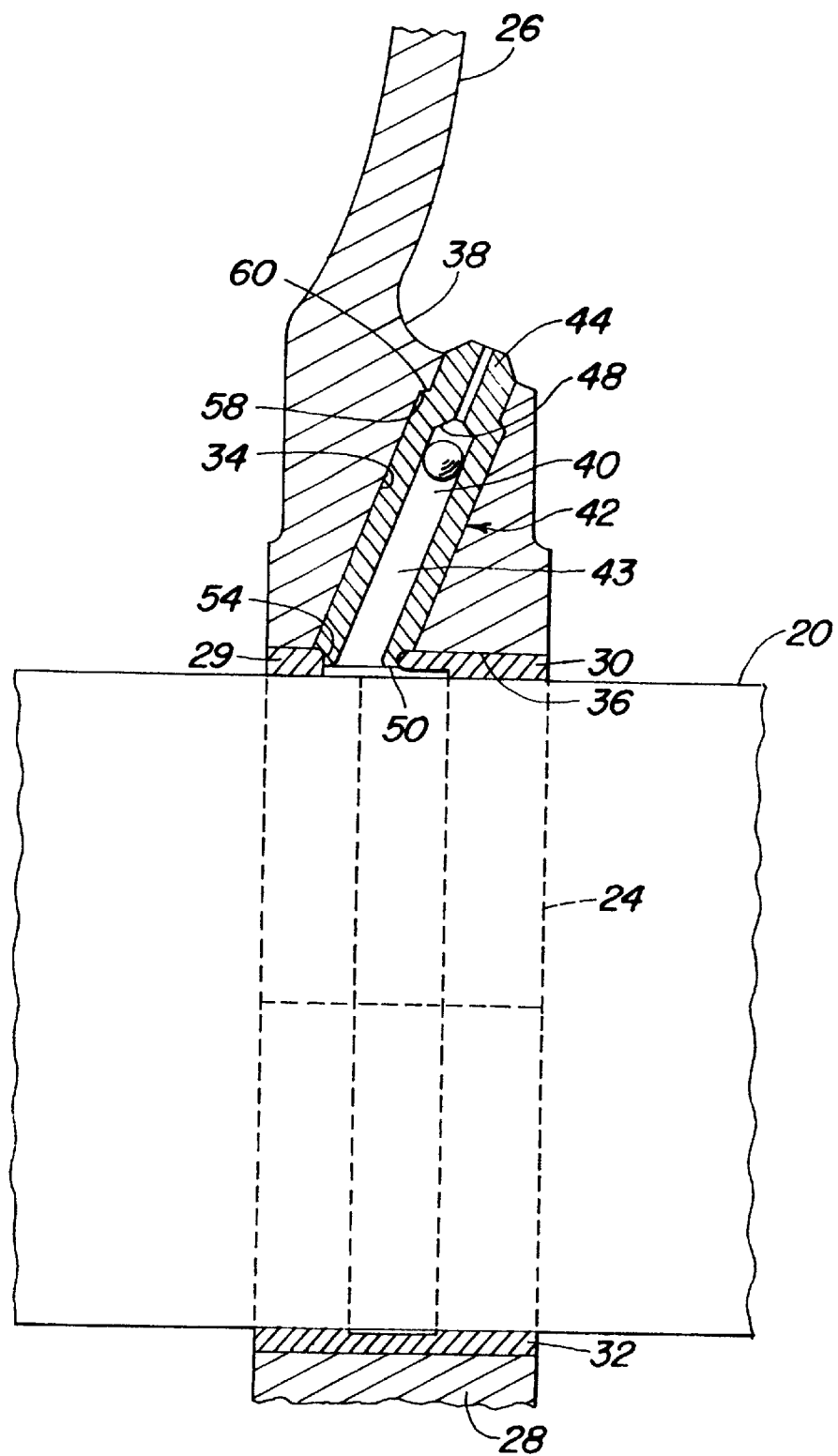
FIG. 2 is a sectional view through a crankshaft bearing, a bearing bushing and a crankshaft in a direction perpendicular to the axis of the crankshaft and showing the lube distribution sleeve of the present invention.

A piston engine 10, such as a compressor or an internal combustion engine, includes a cylinder block 12 in which one or more cylinders 14 are provided. Pistons 16 slide in the cylinders 14 and are connected to a crankshaft 20 by connecting rods 18 which are coupled to piston heads 19. The crankshaft 20 is supported for rotation by crankshaft bearings 24. Each bearing 24 includes a pair of bearing sections or parts 26, 28 which are bolted together by bolts (not shown).

Each crankshaft bearing 24 has a bore 36 extending therethrough which receives and supports a bearing bushing 29. The bearing bushing 29 may have a one-piece configuration, but preferably has a two-piece design, and includes an upper bushing part 30 and a lower bushing part 32. In the assembled condition the bushing parts 30, 32 are clamped together between the bolted bearing parts 26, 28 so that no movement of the bushing 29 is possible. The bearing bushing 29 and its parts 30, 32 must be positioned during the assembly in order to prevent any rotation or sliding during the installation, so that a correct fit is obtained and so that an unrestricted lubricant supply is assured. A relief port 54 extends radially through bushing part 30.

The upper bearing part 26 is formed from a portion of the cylinder block 12, and a lubrication channel 34 extends through part 26. Channel 34 extends from the wall of bore 36 to a wall 38 of the bearing part 26 which faces the cylinder 14. Channel 34 has larger and smaller diameter portions forming and separated by an annular shoulder 58. Channel 34 is communicated through an opening 40 with the lubricating system (not shown) of the 10, so that lubricant can reach the lubrication channel 34.

A hollow sleeve 42 is mounted in channel 34. Sleeve 42 has a central bore 43 and has a spray tip 44 on its outer end which faces the cylinder 14. Bore 43 has a larger and smaller diameter portions which form an annular shoulder 60. Sleeve 42 includes a radial relief port 48 which communicates with channel 34, opening 40, bore 36 and port 54 of the bushing 29. The sleeve 42 has a smaller outer diameter end portion 50 which projects into bore 36 and which is received by port 33 of bushing part 30. Spray tip 44 also has a smaller outer diameter than the main body of sleeve 42, and tip 44 projects slightly beyond the wall 38 of the bearing part 26. Spray tip 44 also has a wall thickness which is larger than the wall thickness of the main body of sleeve 42. End portion 50 preferably forms hook-shaped elements for engaging the bushing part 30. Alternatively, the sleeve 42 may be bonded or hot bonded to the bushing part 30. Thus, lubricating or cooling fluid can be supplied to cylinder 14 of engine 10 through the bore 43 of sleeve 42 and the spray tip 44. Alternatively, sleeve 42 may include circumferental grooves (not shown) for supplying lubricant therethrough.

The insertion of sleeve end portion 50 into port 54 of bushing part 30 and the engagement of sleeve end portion 50 with bushing part 30 holds the upper bushing part 30, and thereby the entire bearing bushing 29, in position within bore 36 of the bearing part 26. Alternatively, a positioning spike or similar device (not shown) could be provided on or in the sleeve 42. But, preferably the sleeve 42 is configured as a one-piece component. The relief port 54 in the bearing bushing 29 may be a depression that is formed or machined into its surface. Preferably, the port 54 is a bore which extends through the bushing 29.

Preferably, the sleeve 42 is made of a plastic material, since the sleeve 42 is subject to only low loads when it is installed in channel 34. Alternatively, sleeve 42 could be made out of a metallic material and turned on a lathe.

In addition, an inner annular groove 56 is formed in both bushing parts 30, 32, so that the groove 56 extends around the entire inner surface of the bushing 29, in order to distribute the lubricant uniformly. Thus, groove 56 is communicated with opening 40 via port 48, so that flow of lubricant is possible through the opening 40 in the cylinder block 12 to the lubricating system, through the spray tip 44 to the cylinder 14 and to the piston head 19, as well as into the bearing bushing 29. Thus, sleeve 42 distributes lubricant and also positions the bearing bushing 29 during assembly.

The assembly of the bearing bushing 29 with the bearing parts 30, 32 and the crankshaft 20 is performed by first inserting the sleeve 42 from the wall of bore 36, preferably with a drive fit, until sleeve shoulder 60 engages shoulder 58. The sleeve 42 is retained in the bearing part 26 in a friction locking fit. Alternatively, sleeve 42 may be retained by a positive locking fit, such as by a threaded engagement between an external thread (not shown) on the sleeve 42 and an internal thread (not shown) provided in the channel 34. Following this, the first bushing part 30 is inserted into the bearing part 26, preferably, while the cylinder block 12 is oriented so that the bushing part 30 and other components, such as the crankshaft 20, can be placed on the bearing part without being retained by hand. In order to position the bushing part 30, the end 50 of the sleeve 42 is inserted into the port 54 in the bushing part 30, to prevent bushing part 30 from rotating or sliding with respect to the bearing part 26, and the cylinder block 12.

After placing the first bushing part 30, the crankshaft 20 is placed into it and bushing part 30, and then the second bushing part 32 is installed so that the position of the entire bearing bushing 29 is determined by the engagement of sleeve 42 through the first bushing part 30 and by the engagement of the crankshaft 20 with the bushing 29.

Finally, the second bearing part 28 is bolted to bearing part 26, so that the bearing bushing 29 or its parts 30, 32 are clamped therebetween with a friction locking fit. Since the bearing bushings 29 are clamped during operation between the bolted bearing parts 26, 28, no or little load is applied to the sleeve 42 during operation of the engine 10.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A lubrication element for a piston engine, the engine having a lubrication system, a crankshaft bearing member and a bearing bushing receiving and supporting a crankshaft, the lubrication element including a lubricant distribution sleeve mounted in the crankshaft bearing member, the improvement wherein:

the sleeve engages the bearing bushing and positions the bearing bushing within the crankshaft bearing member.

2. The lubrication element of claim 1, wherein:

the bearing bushing includes a port which is communicated with the sleeve.

3. The lubrication element of claim 2, wherein:

the bearing bushing includes a lubrication groove which is communicated with the sleeve through the port.

4. The lubrication element of claim 1, wherein:

the sleeve includes a port and a central bore which are communicated with the lubricating system.

5. The lubrication element of claim 1, wherein:

the sleeve includes a spray tip which forms a spray nozzle.

6. The lubrication element of claim 5 wherein:

the spray tip directs lube fluid towards a cylinder of the engine.

7. The lubrication element of claim 1, wherein:

the sleeve is open at an end oriented towards a cylinder of the engine.

8. The lubrication element of claim 1, wherein:

the bearing bushing comprises a pair of bushing parts.

9. The lubrication element of claim 1, wherein:

the sleeve is formed out of a plastic material.

10. The lubrication element of claim 1, wherein:

the sleeve has an end which engages the bearing bushing.

11. The lubrication element of claim 1, wherein:

the sleeve has an end which engages the bearing bushing and which is received in a port formed in the bearing bushing.

12. The lubrication element of claim 1, wherein:

the sleeve has an end which engages the bearing bushing, and the sleeve comprises a central bore and a radial port which communicate lubricant to the sleeve end and to the bearing bushing.

* * * * *